United States Patent
McDonald et al.

(10) Patent No.: US 7,641,149 B2
(45) Date of Patent: Jan. 5, 2010

(54) MULTI-EXIT COMBINED EVACUATION SLIDE

(75) Inventors: Steven P. McDonald, Marysville, WA (US); Robert J. Lenaburg, Des Moines, WA (US)

(73) Assignee: The Boeing Company, Chicago, IL (US)

( * ) Notice: Subject to any disclaimer, the term of this patent is extended or adjusted under 35 U.S.C. 154(b) by 319 days.

(21) Appl. No.: 11/674,376

(22) Filed: Feb. 13, 2007

(65) Prior Publication Data

US 2008/0191097 A1 Aug. 14, 2008

(51) Int. Cl.
*B64D 9/00* (2006.01)
(52) U.S. Cl. .................... 244/137.2; 244/905
(58) Field of Classification Search ........... 244/137.2, 244/137.1, 905; 182/48; 472/117; 114/362
See application file for complete search history.

(56) References Cited

U.S. PATENT DOCUMENTS

| | | | | |
|---|---|---|---|---|
| 3,476,338 A | * | 11/1969 | Fisher | 244/137.2 |
| 3,692,144 A | | 9/1972 | Summer et al. | |
| 3,712,417 A | | 1/1973 | Chacko et al. | |
| 3,973,645 A | | 8/1976 | Dix et al. | |
| 4,246,980 A | * | 1/1981 | Miller | 182/48 |
| 4,684,079 A | | 8/1987 | Miller et al. | |
| 4,846,422 A | * | 7/1989 | Fisher | 244/137.2 |
| 6,443,259 B1 | * | 9/2002 | Oney et al. | 182/48 |
| 2002/0005460 A1 | * | 1/2002 | Dazet et al. | 244/137.2 |
| 2004/0195457 A1 | * | 10/2004 | Baker et al. | 244/137.2 |
| 2006/0266888 A1 | * | 11/2006 | Matsch | 244/137.2 |

OTHER PUBLICATIONS

PCT Intl Search Report and Written Opinion for Application No. PCT/US2008/052523, dated Aug 19, 2008, 12 pgs.

* cited by examiner

*Primary Examiner*—Michael R Mansen
*Assistant Examiner*—Valentina Xavier
(74) *Attorney, Agent, or Firm*—Lee & Hayes, PLLC

(57) ABSTRACT

In one embodiment of a multi-exit evacuation slide for an aircraft, an inflatable evacuation slide for emergency evacuation includes two coupled inflatable portions. The first inflatable portion, which includes a first inclined sliding surface, is configured to provide downward egress from an over-wing exit. Similarly, the second inflatable portion, which includes a second inclined surface, is likewise configured to provide downward egress from a non over-wing exit. In particular embodiments, the inflatable portions are configured to be deployed from a storage location proximate the over-wing and non over-wing exits. In other embodiments, at least one of the first and second inflatable portions includes a lateral area for horizontal movement. In alternative embodiments, the inflatable evacuation slide further includes a divider rail disposed between the first inflatable portion and the second inflatable portion.

20 Claims, 4 Drawing Sheets

MULTI-EXIT COMBINED EVACUATION SLIDE

FIELD OF THE INVENTION

This invention relates to systems and methods for emergency evacuation, and more specifically, to systems and methods for inflatable slides for emergency evacuation from aircraft.

BACKGROUND OF THE INVENTION

In today's commercial transport fleets, aircraft emergency exits that are more than six feet above the ground are generally required to have approved systems to assist occupants to the ground in the event of an emergency. Generally, the approved system at each emergency exit is an inflatable evacuation slide installed at that exit.

For an over-wing emergency exit, or an emergency exit that is positioned in the fuselage above the wing of an aircraft, the current evacuation slide design is typically a slide extending aft off the trailing edge of the wing (parallel with the fuselage). In contrast, for a non-over-wing exit, the current evacuation slide design is typically a slide extending normal to the fuselage. Due to emergency exit spacing on some aircraft models and the lengths of the slides, it may be necessary to cant the off-wing evacuation slide outboard and cant an adjacent non-over-wing escape slide away from the wing to provide sufficient clearance between the two slides.

However, in many instances, canting an off-wing slide and an adjacent non-over-wing slide in order to provide adequate clearance between the two slides may increase the complexity of the slides and result in additional slide weight, pack volume and increased cost.

In some prior cases, aircraft equipped with side-by-side over-wing emergency exits have been configured with a single dual-lane evacuation slide that provides for egress via the wing. However, such dual-lane evacuation slides only serve exits that are adjacent to each other over a wing. Therefore, novel systems and methods which reduce the complexity, weight, pack volume, and cost associated with simultaneously providing the two types of slides for a plurality of non-adjacent emergency exits, would have utility.

SUMMARY OF THE INVENTION

The present invention is directed to systems and methods for multi-exit combined evacuation slide. Embodiments of systems and methods in accordance with the present invention may advantageously allow the deployment of a multi-exit evacuation slide that enables simultaneous egress from a plurality of exits, such as an over-wing exit and a non over-wing exit, from a single storage location. Embodiments of systems and methods in accordance with the present invention may reduce potential interference associated with deploying multiple slides for the plurality of exits, and may also reduce the complexity, weight, pack volume, and cost associated with providing different types of slides on an aircraft, in comparison with the prior art.

In one embodiment, an inflatable evacuation slide for emergency evacuation includes two inflatable portions. The first inflatable portion, which includes a first inclined sliding surface, is configured to provide downward egress from an over-wing exit. Similarly, the second inflatable portion, which includes a second inclined sliding surface, is likewise configured to provide downward egress from a non over-wing exit.

In particular embodiments, the inflatable portions are configured to be deployed from a storage location proximate the over-wing and non over-wing exits. In other embodiments, the at least one of the first and second inflatable portions include a lateral area for horizontal movement. In alternative embodiments, the inflatable evacuation slide further includes a divider rail disposed between the first inflatable portion and the second inflatable portion.

BRIEF DESCRIPTION OF THE DRAWINGS

Embodiments of the present invention are described in detail below with reference to the following drawings.

DETAILED DESCRIPTION

The present invention relates to systems and methods for inflatable emergency evacuation slides for exiting aircraft. Many specific details of certain embodiments of the invention are set forth in the following description and in FIGS. 1-4 to provide a thorough understanding of such embodiments. The present invention may have additional embodiments, or may be practiced without one or more of the details described below.

Generally, embodiments of systems and methods in accordance with the invention provide a multi-exit evacuation slide configured to provide egress from a plurality of exits. With respect to an aircraft, the multi-exit evacuation slide advantageously deploys from a single storage location and may eliminate any interference, (i.e., mutual slide obstruction) associated with deploying multiple slides for a plurality of aircraft exits. Thus, embodiments of the invention may reduce the complexity, weight, pack volume, and cost associated with providing multiple or different types of slides on an aircraft (e.g., an over-wing type slide and an aft-wing type), in comparison with the prior art systems and methods.

Figure 1:
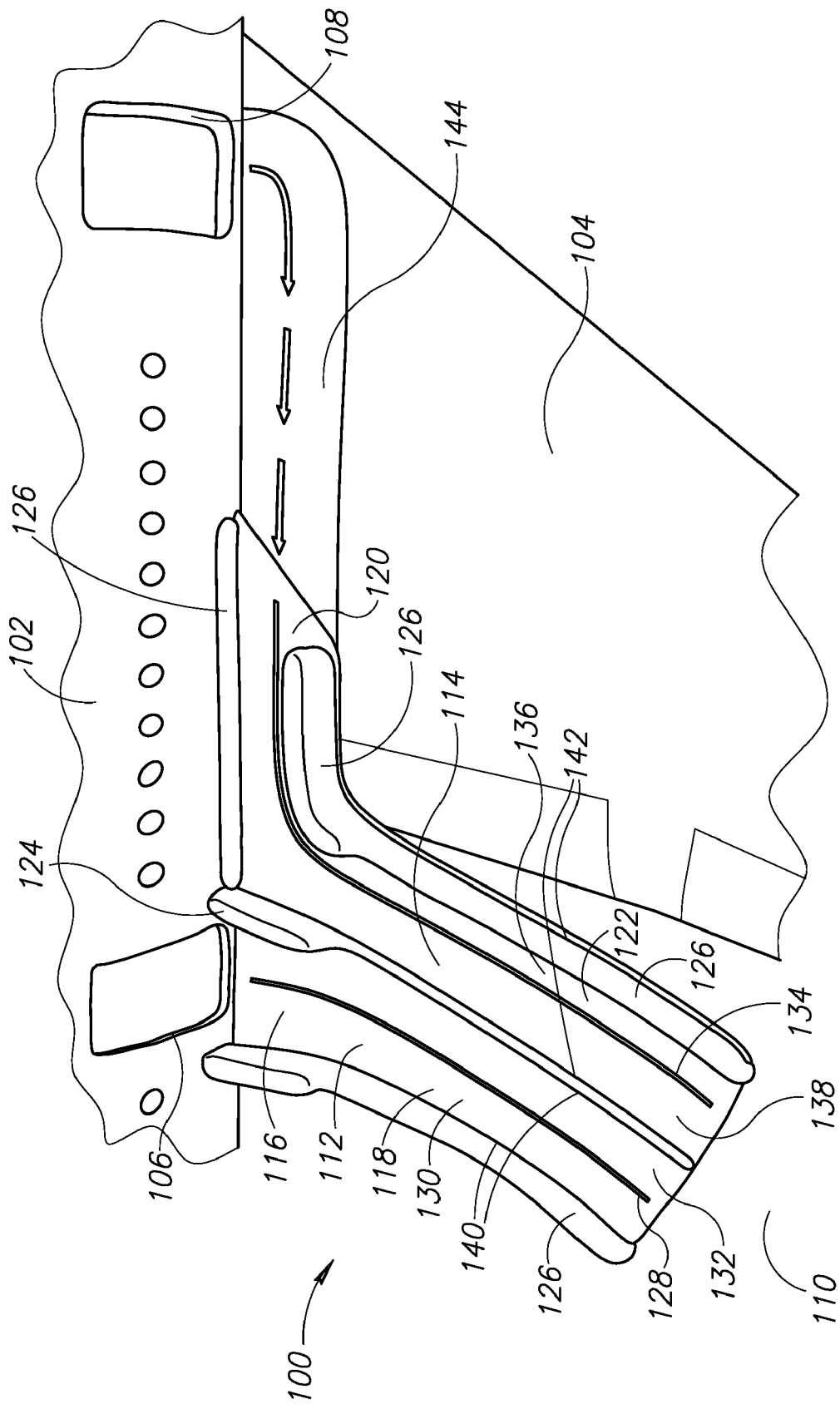
FIG. 1 is a plan view of the top surface of a deployed evacuation slide in accordance with an embodiment of the invention.

FIG. 1 is a plan view depicting the top surface of a deployed inflatable evacuation slide 100 in accordance with an embodiment of the invention. For contextual reference, FIG. 1 also illustrates portions of an aircraft fuselage 102, an aircraft wing 104, a non over-wing exit 106, an over-wing exit 108, and a lower surface 110 (e.g. ground surface).

It will be appreciated that inflatable evacuation slides typically include air-tight assemblies. The assemblies are generally configured to receive gas from gas sources when the inflatable evacuation slide is deployed. Typically, each inflatable evacuation slide may include a slide section, as well as one or more support sections for supporting and bridging the slide section to the lower surface 110.

It will be further appreciated that inflatable evacuation slides may be formed from a variety of suitable air-tight materials. For example, an inflatable evacuation slide may be fabricated from a light weight fabric coated with an elastomer (e.g., urethane). The various parts of the inflatable evacuation slide may be joined together with suitable adhesive so that a unitary assembly is formed. However, it will be appreciated that other materials and component joining techniques may be used, so long as the fabricated inflatable evacuation slides precludes airflow from their structures during inflation as well as during operation in the inflated state.

It will also be appreciated that the term "evacuation slides," as used in this patent application, also covers "slide rafts," that is, evacuation slides that are also specifically designed for deployment into a water environment. Typically, a "slide raft" may include an erectable canopy, one or more compartments to hold evacuees, and one or more survival kits containing supplies such as first aid kits, survival ration, and flares.

In FIG. 1, the evacuation slide 100 is shown in a deployed state, meaning that evacuation slide 100 has been inflated with a gas from a gas source (not shown). The evacuation slide 100 includes a first inflatable portion 112 and an integral second inflatable portion 114 coupled to the first inflatable portion 112. Specifically, the portions 112, 114 may be part of the same unitary assembly. In the alternative, the portions 112, 114 may also be separate assemblies coupled together along at least a part of each respective portion 112, 114. The evacuation slide 100 may be deployed from a storage location proximate the first non over-wing exit 106 and the second over-wing exit 108. Following deployment, the inflated evacuation slide 100 is secured to the side of the aircraft fuselage 102 in such a way that inflatable portion 112 may receive evacuees from the elevated non over-wing exit 106, and the second inflatable portion 114 may receive evacuees from the elevated over-wing exit 108.

In this embodiment, the first inflatable portion 112 includes a porch 116 and a first sliding section 118 that extends to the lower surface 110 (e.g., ground surface). The porch 116 may be relatively level (or relatively non-inclined) and may provide a lateral area for the horizontal movement of evacuees during an evacuation from non over-wing exit 106. In turn, the first sliding section 118 may provide evacuees with a downward sliding (or inclined) surface for quick egress from the non over-wing exit 106. However, in some embodiments, the porch 116 may be eliminated. For example, the porch 116 may be eliminated when the first inflatable portion 112 may be deployed at an angle sufficiently perpendicular to the non over-wing exit 106 so that adequate space for staging downward egress from the non over-wing exit 106 is present.

Likewise, in the embodiment shown in FIG. 1, the second inflatable portion 114 includes a ramp 120 and a second sliding section 122. The ramp 120 may provide a lateral area for the movement of evacuees over at least part of the wing 104 to the sliding section 122. In alternate embodiments, the ramp 120 may be configured to end proximate to the over-wing exit 108. In such alternative embodiments, a portion of the aircraft wing 104 may serve to bridge the distance from the over-wing exit 108 to the end of the ramp 120. To facilitate the transfer of evacuees from the over-wing exit 108 to the ramp 120, a portion of the aircraft wing 104 may be painted with appropriate indication marks 144 to guide evacuees.

However, in still other embodiments, the ramp 120 may be configured to extend to the over-wing exit 108 so that evacuees may egress directly from the over-wing exit 108 onto ramp 120. In additional embodiments, the ramp 120 may follow the curvature of the wing 104 and slope downward as it extends from a portion proximate the over-wing exit 108 to the second sliding section 122. In some of these additional embodiments, the ramp 120 may be sufficiently sloped as to provide an angled surface suitable for sliding. Thus, the ramp 120 may constitute a component of the second sliding section 122.

As further shown on FIG. 1, the first and second inflatable portions 112, 114 provide approximately aligned and sloped first and second sliding sections 118 and 122, respectively. The first and second sliding sections 118, 122 provide sliding surfaces that may allow evacuees to move downward in sitting or reclined positions. The first and second inflatable portions 112, 114 may be configured to be deployed at any desired angle to the fuselage (e.g., canted aft, that is, toward the rear of the aircraft), provided that the angle does not interfere with the egress of evacuees from both exits.

The first and second inflatable portions 112, 114 may be wholly or partially separated by a divider 124. The divider 124 may, for example, separate the porch 116 from the ramp 120, or the first sliding section 118 from the second sliding section 122, or both. In other words, the divider 124 may serve to separate evacuees exiting the non over-wing exit 106 from the evacuees exiting the over-wing exit 108. In this way, the divider 124 may serve to facilitate the orderly evacuation of evacuees from the aircraft fuselage 102.

In some embodiments, the divider 124 may vary in thickness along its length. For example, the thickness of the divider 124 may increase where it nears the fuselage 102. The variation in thickness may assist in channeling evacuees along the shortest distance down the inflatable portions so that evacuation efficiency may be maximized. In other embodiments, the divider 124 may be configured to accomplish the same result by forking where it nears the fuselage 102. In additional embodiments, two dividers, or guardrails, may separate the porch 116 and the first sliding section 118 from the ramp 120 and the second sliding section 122. The two dividers may be disposed substantially adjacent to each other for part of their lengths, and then diverge for the remainder of their lengths. For example, in some embodiments, the two dividers may be disposed substantially adjacent to each other when they are separating the first and second sliding sections 118, 122, and disposed divergently when they are separating the porch 116 from the ramp 120.

The first and second inflatable portions 112, 114 may also be equipped with one or more guardrails 126 along portions of their outer perimeters, so long as the guardrails 126 do not obstruct egress from the non over-wing exit 106 and the over-wing exit 108, and egress to the lower surface 110. The guard rails 126 may serve to ensure that the evacuees remain on the first and second inflatable portions 112, 114 until they have reached the lower surface 110.

In other embodiments, the first inflatable portion 112 may be configured with one or more separation rails 128. The one or more separation rails 128 may serve to divide inflatable portion 112 into a plurality of evacuation channels (e.g. channel 130, 132). In this way, a plurality of evacuees may simultaneously egress from the exit service by inflatable portion 112 (i.e., non over-wing exit 106).

Likewise, in further embodiments, the second inflatable portion 114 may also be configured with one or more separation rails 134. The one or more separation rails 134 may serve to divide inflatable portion 112 into a plurality of evacuation channels (e.g., channels 136, 138). Accordingly, a plurality of evacuees may simultaneously egress from the exit serviced by inflatable portion 114 (i.e., over-wing exit 108). Moreover, additional embodiments may be equipped with both one or more separation rails 128 and one or more separation rails 134.

In some embodiments, each of the divider 124, guardrails 126, and, separation rails 128, 134, may be an integral part of the unitary assembly of the evacuation slide 100. In other embodiments, each of the divider 124, and guard rails 126, and separation rails 128, 134, may be constructed from a separate inflatable member pneumatically coupled to one or both of the inflatable portions 112, 114. In additional embodiments, each of the divider 124, guard rails 126, and separation rails 128, 134, may include a plurality of inflatable support strut members pneumatically coupled to the inflatable portions 112, 114, a connecting rail member running along the top of and pneumatically coupled to the support struts, and light material that closes off the spaces between the struts. Furthermore, in yet other embodiments, divider 124, guardrails 126, and separation rails 128, 134 may include a combination of two or more of the integral members, separate pneumatically coupled members, and strut-based members.

It will be appreciated that the divider 124, the guardrails 126, and separation rails 128, 134 may be of any height, so long as they are elevated above the upper surfaces of the first and second inflatable portions 112, 114. Furthermore, the divider 124, guardrails 126, and separation rails 128, 134 may vary in height along their length. In one embodiment, the height of the divider 124, the guardrails 126, and separation rails 128, 134 may be greater at areas where evacuees are likely to be standing or walking, and less at areas where evacuees are likely to be sliding in sitting or reclined positions. For example, the height of the divider 124, guardrails 126, and separation rails 128, 134 on porch 116 and ramp 120 may be greater than their height along the sliding sections 118 and 122. In another embodiment, the ramp 120 may be provided with one or more guardrails 126 on the inboard side that are shorter than those on the outboard side. This is because the fuselage 102 may act as a guard barrier on the inboard side.

Nevertheless, in other embodiments, the sliding surfaces provided by sliding sections 118, 122, may be configured so that each sliding surface forms a concave channel. This way, the longitudinal sides 140 of the sliding section 118, and the longitudinal sides 142 of the sliding section 122 may serve to guide the evacuees to the lower surface 110, and some of the guardrails 126 may not be provided.

Figure 2:
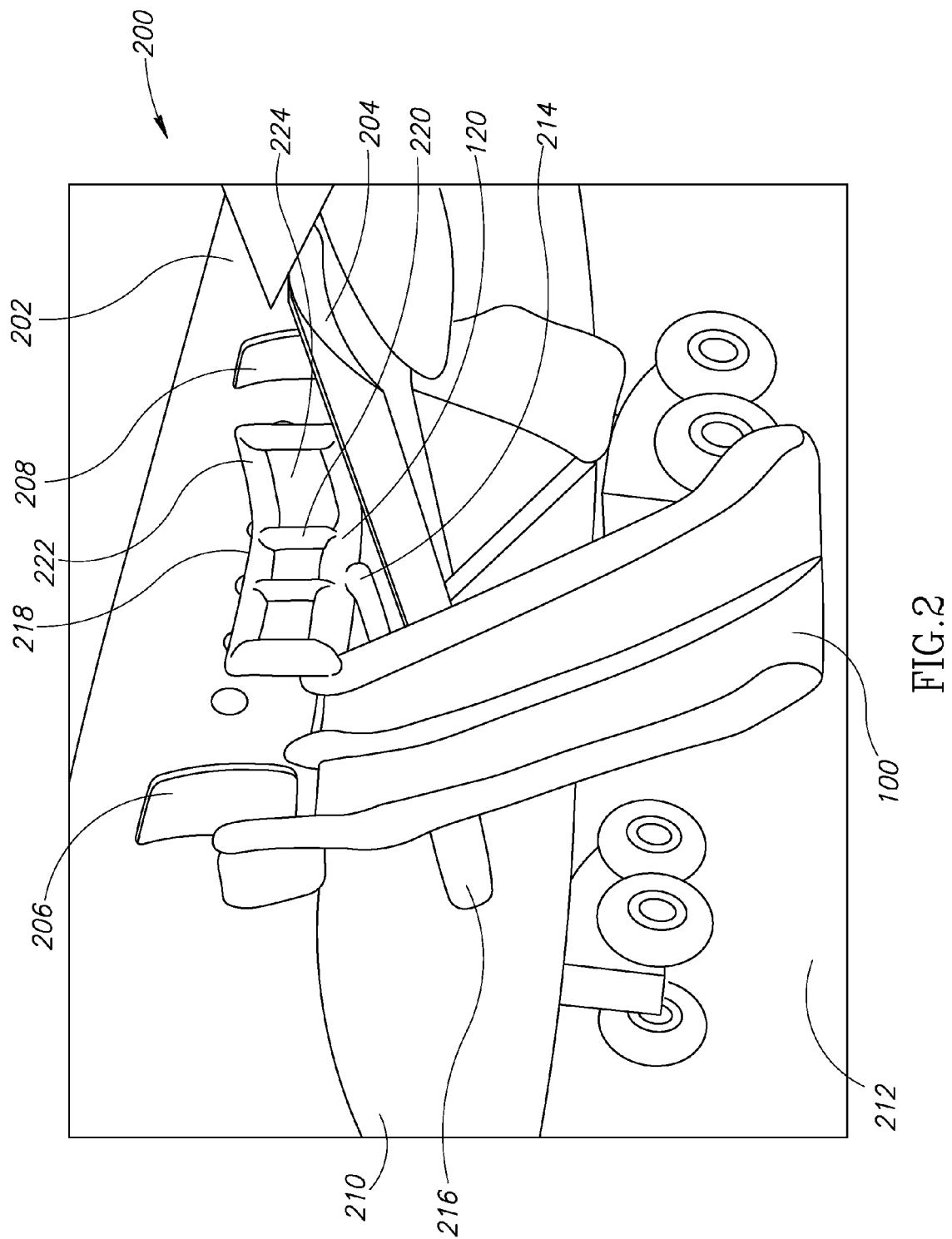
FIG. 2 is an isometric view of the evacuation slide as shown in FIG. 1, again showing the slide in the fully deployed state, in accordance with an embodiment of the invention.

FIG. 2 is an isometric view 200 of the evacuation slide 100 as shown in FIG. 1, again showing the slide in the fully deployed state, in accordance with an embodiment of the invention. For contextual reference, FIG. 2 also illustrates portions of an aircraft fuselage 202, an aircraft wing 204, a non over-wing exit 206, an over-wing exit 208, a wing-to-body fairing 210, and a lower surface 212. In this embodiment, the evacuation slide 100 may include one or more over-wing support sections 214 configured to support inflatable portion 114, specifically the lateral ramp 120, over the aircraft wing 204. In one embodiment, the support sections 214 may be employed to provide a horizontal lateral ramp 120 despite any aft (trailing edge) downward slant of the aircraft wing 204. In another embodiment, the support sections 214 may serve to alter the slope of the lateral ramp 120 with relation to the aft downward slant of the aircraft wing 204. In other embodiments, the evacuation slide 100 may also be equipped with one or more slide supports 216 on the underside of the slide. These underside support sections 216 may be used to brace the evacuation slide 100 against the fuselage 202 or other structural members (e.g., wing-to-body fairing 210) of an aircraft to help further stabilize the evacuation slide 100 during evacuation. It will be appreciated that the various support sections may be constructed of inflatable members pneumatically coupled to the evacuation slide 100, or may be formed as an integral part of the evacuation slide 100.

Lastly, FIG. 2 also further illustrates a strut-based guard rail 218, as describe above. As shown, the strut-based guard rail 218 include a plurality of inflatable support strut members 220, a connecting rail member 222 running along the top of and pneumatically coupled to the support struts, and light material 224 that closes off the spaces between the strut members 220.

Figure 3:
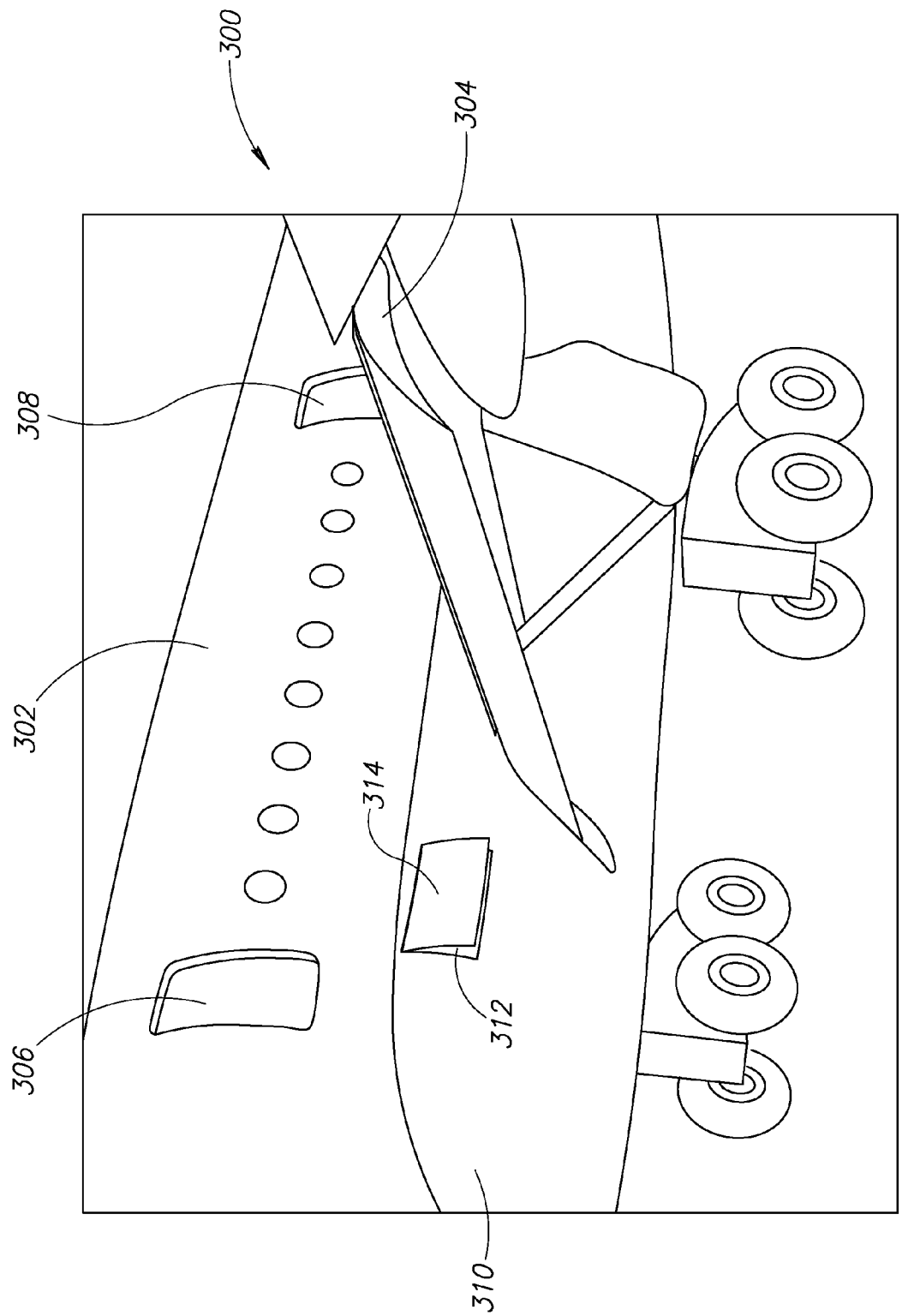
FIG. 3 is an isometric view illustrating an exemplary storage compartment for inflatable evacuation slide, as shown in FIG. 1, in accordance with an embodiment of the invention.

FIG. 3 is an isometric view 300 illustrating an exemplary storage compartment 312 for inflatable evacuation slide 100, as shown in FIG. 1, in accordance with an embodiment of the invention. For contextual reference, FIG. 3 also depicts portions of an aircraft fuselage 302, an aircraft wing 304, a non over-wing exit 306, an over-wing exit 308, and an aircraft wing-to-body fairing 310. In this embodiment, the storage compartment 312 is proximate the non over-wing exit 306 and the over-wing exit 308. Specifically, as illustrated in FIG. 3, the storage compartment 312 may be located aft of the over-wing exit 308, forward of the non over-wing exit 306, and below the sills of exits 306 and 308, in the wing-to-body fairing 310. However, it is readily understood that any aircraft structure in that vicinity (e.g. fuselage 302), may be configured to house the compartment 312, provide there is sufficient space within the structure. The storage compartment 312 is typically covered and protected by a movable cover 314 that matches the contour of the exterior. When the need to evacuate arises, controls located in the interior of the fuselage 302 may enable the evacuation slide 100 to be automatically deployed and inflated from the storage compartment 312 when at least one of the non over-wing exit 306 and over-wing exit 308 is opened. In additional embodiments, each of the exits 306, 308 may be further equipped with a manual backup system that is configured to deploy and inflate the evacuation slide 100. Additionally, the storage compartment 312 may further contain an attachment point that operatively couples the evacuation slide 100 to the aircraft fuselage 302.

At deployment, the inflatable evacuation slide 100 may be inflated by conventional means so that at least a portion the upper surface of the porch 116, and at least a portion of the upper surface of the ramp 120, respectively, of the evacuation slide 100, are proximate with the sill of exit 306 and 308. In some embodiments, the inflatable evacuation slide 100 may be inflated so that even if the sills of exit 306 and 308 do not substantially lie in the same horizontal plane, at least a portion the upper surface of the porch 116, and at least a portion of the upper surface of the ramp 120, respectively, are nevertheless proximate with the sill of exit 306 and 308. Moreover, one ordinarily skilled art will readily appreciate that the location of the storage compartment 312 may vary within the general vicinity proximate exits 306 and 308 in other embodiments, so long as the inflated evacuation slide 100 that is deployed from compartment 312 provides expedient and safe emergency egress from exits 306 and 308.

While FIGS. 1-3 depicts a non over-wing exit 106 that is an aft-wing exit, that is, an exit that is located to the rear of the wing, it will be appreciated that a non over-wing exit 106 may also be a forward exit, that is, an exit located between the wing and the nose of the aircraft.

Embodiments of systems and methods in accordance with the present invention may provide significant advantages over the prior art. For example, because the multi-exit evacuation slide enables simultaneous egress from a plurality of exits, the multi-exit evacuation slide may reduce or eliminate potential implementation problem such as interference or mutual obstruction, which may be encountered with providing multiple slides or multiple types of slides for the plurality of exits. Furthermore, the multi-exit evacuation slide and may also reduce the complexity, weight, pack volume, and cost associated with provide different types of slides on an aircraft, in comparison with the prior art. Additionally, the multi-exit evacuation slide of the present invention may also eliminate in-cabin stowage of escape slides and associated door lining covers (e.g., bustles) that intrude into cabin space.

Figure 4:
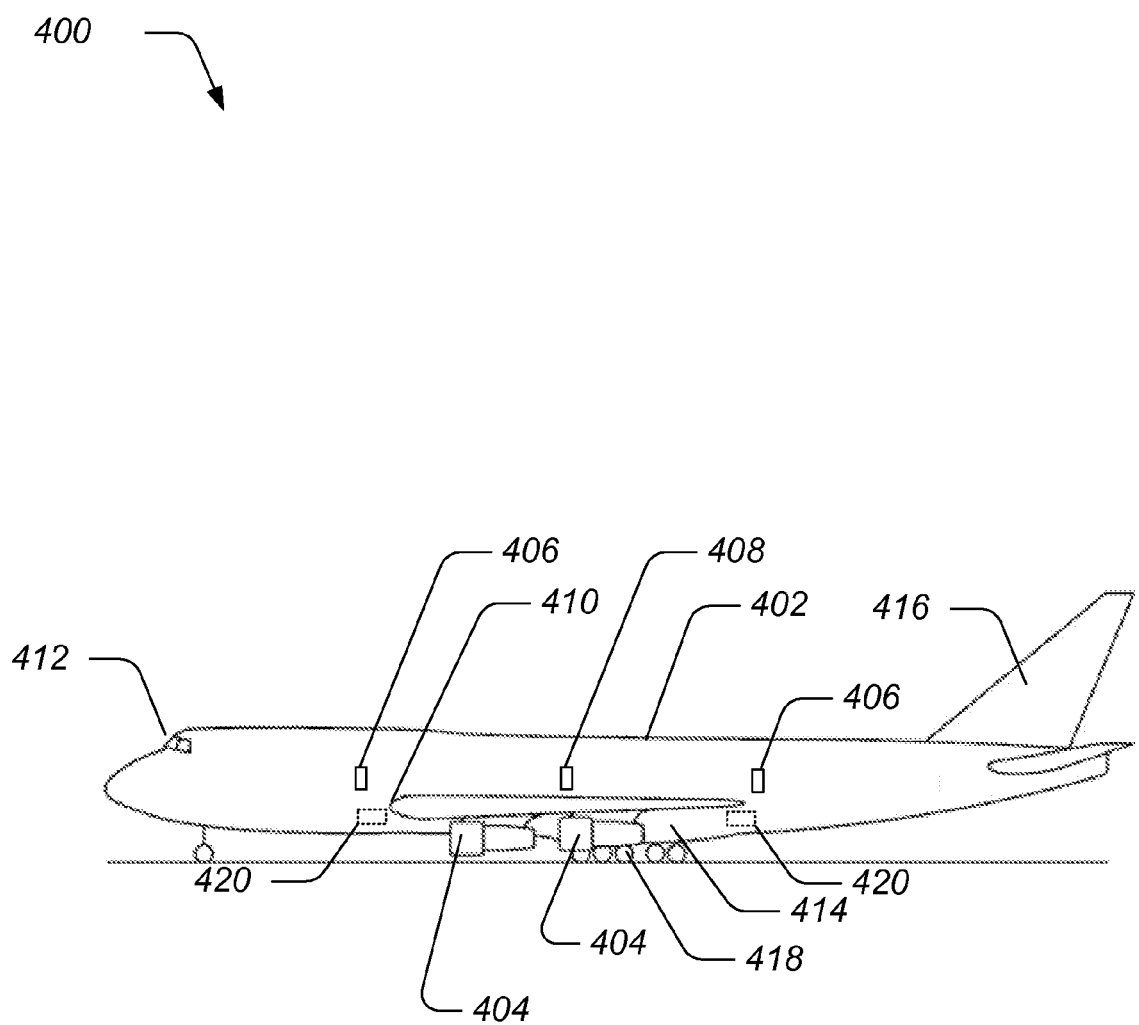
FIG. 4 is a side elevational view of an aircraft equipped with an evacuation slide (not deployed) as illustrated in FIG. 1, in accordance with another embodiment of the invention.

FIG. 4 is a side elevational view of an aircraft equipped with an evacuation slide (not deployed) as illustrated in FIG. 1, in accordance with another embodiment of the invention. In general, except for one or more systems in accordance with the present invention, the various components and subsystems of the aircraft 400 may be of known construction and, for the sake of brevity, will not be described in detail herein. As shown in FIG. 4, the aircraft 400 includes one or more propulsion units 404 coupled to a fuselage 402, a cockpit 412 in the fuselage 402, non over-wing exits 406, over-wing exit 408, wing assemblies 410 (or other lifting surfaces), a wing-to-body fairing 414, a tail assembly 416, a landing assembly 418, a control system (not visible), and a host of other systems and subsystems that enable proper operation of the aircraft 400. At least one evacuation slide formed in accordance with the present invention may be deployed from storage compartment 420 in the wing-to-body fairing 414. However, other evacuation slide formed in accordance with the present invention may be distributed in storage compartments in other portions of aircraft 400.

Although the aircraft 400 shown in FIG. 4 is generally representative of a commercial passenger aircraft, including, for example, the 737, 747, 757, 767, 777, and 787 models commercially-available from The BOEING Company of Chicago, Ill., the inventive apparatus and methods disclosed herein may also be employed in the assembly of virtually any other types of aircraft. More specifically, the teachings of the present invention may be applied to the manufacture and assembly of other passenger aircraft, cargo aircraft, rotary aircraft, and any other types of aircraft, including those described, for example, in The Illustrated Encyclopedia of Military Aircraft by Enzo Angetucci, published by Book Sales Publishers, September 2001, and in Jane's All the World's Aircraft published by Jane's Information Group of Coulsdon, Surrey, United Kingdom, which texts are incorporated herein by reference. It may also be appreciated that alternate embodiments of system and methods in accordance with the present invention may be utilized in other manned aerial vehicles. Additionally, embodiments of the present invention may also be used in a wide variety of other vehicles, including ships, trains, and any other suitable vehicle where space limitation may make it necessary to provide multi-exit inflatable evacuation slides.

While embodiments of the invention have been illustrated and described above, many changes can be made without departing from the spirit and scope of the invention. Accordingly, the scope of the invention is not limited by the disclosure of these embodiments. Instead, the invention should be determined entirely by reference to the claims that follow.

What is claimed is:

1. An inflatable evacuation slide for emergency evacuation, comprising:
   a first inflatable structure including a first inclined sliding surface to provide downward egress from an over-wing exit of an aircraft; and
      a second inflatable structure including a second inclined sliding surface to provide downward egress from a non over-wing exit of the aircraft,
      wherein the first inflatable structure is coupled to the second inflatable structure, and the inflatable structures are inflatably deployed from a fuselage storage location below a wing of the aircraft and proximate and between the over-wing and non over-wing exits and wherein the first inflatable structure or the second inflatable structure includes a lateral ramp that deploys at least partially over the wing.

2. The evacuation slide of claim 1, wherein at least one of the inflatable structures include a protruding underside support section that braces the at least one of the inflatable portions against at least one of a fuselage or a wing-to-body fairing.

3. The evacuation slide of claim 1, further comprising a divider rail disposed between the first inflatable structure and the second inflatable structure.

4. The evacuation slide of claim 3, wherein the divider rail is to separate the first inclined sliding surface from the second inclined sliding surface.

5. The evacuation slide of claim 1, wherein the first inclined sliding surface includes at least one first longitudinal guardrail and the second inclined sliding surface includes at least one second longitudinal guardrail.

6. The evacuation slide of claim 1, wherein the lateral ramp further includes at least one outer edge and at least one guardrail disposed proximate the at least one outer edge.

7. A method of deploying an inflatable slide for emergency evacuation, comprising:
   deploying a first inflatable structure including a first inclined sliding surface to provide downward egress from an over-wing exit from a storage location below a wing of an aircraft, the storage location being a fuselage storage location or a wing-to-body fairing storage location;
   simultaneously with deploying the first inflatable structure, deploying a second inflatable structure including a second inclined sliding surface to provide downward egress from a non over-wing exit from the storage location, wherein the first inflatable structure is coupled to the second inflatable structure,
   deploying an inflatable lateral ramp for egress over the wing from the storage location, the inflatable lateral ramp is coupled to the first inflatable structure.

8. The method of claim 7, wherein the storage location is further proximate the over-wing and non over-wing exits.

9. The method of claim 7, wherein deploying the first and second inflatable structures includes deploying a protruding underside support section of the inflatable structures that braces the inflatable structures against at least one of the fuselage or the wing-to-body fairing.

10. The method of claim 7, further comprising providing a divider rail between the first inflatable structure and the second inflatable structure, wherein the divider rail is configured to at least separate the first inclined sliding surface from the second inclined sliding surface.

11. The method of claim 7, further comprising providing at least one first separation rail configured to divide the first sliding surface into a plurality of first channels, and providing at least one second separation rail configured to divide the second sliding surface into a plurality of second channels.

12. The method of claim 7, wherein the first inclined sliding surface include a first pair of longitudinal sides and the second inclined sliding surface includes a second pair of longitudinal sides, and wherein deploying the first inflatable structure includes deploying a guardrail along at least one side of the first pair of longitudinal sides, and deploying the second inflatable structure includes deploying a guardrail along at least one side of the second pair of longitudinal sides.

13. The method of claim 7, the inflatable lateral ramp includes one or more protruding over-wing support sections disposed under the lateral ramp and rest on the wing to compensate for an aft downward slant of the wing to enable substantially horizontal egress.

14. An aircraft comprising:

a fuselage including at least two exits;

a wing-to-body fairing operatively coupled to the fuselage;

a wing operatively coupled to the wing-to-body fairing;

a propulsion system operatively coupled to at least one of the fuselage and the wing; and at least one evacuation slide for emergency evacuation at least partially disposed within a storage location in one of the wing-to-body fairing or the fuselage between an over-wing exit and a non over-wing exit and below the wing, the evacuation slide comprising:

a first inflatable structure including a first inclined sliding surface to provide downward egress from the non over-wing exit; and a second inflatable structure including a second inclined sliding surface to provide downward egress from the over-wing exit and a lateral ramp to be at least partially inflated over the wing, wherein the first inflatable structure is coupled to the second inflatable structure.

15. The aircraft of claim 14, wherein the inflatable structures to be deployed and inflated from the storage location when at least one of the over-wing exit and non over-wing exit is opened.

16. The aircraft of claim 14, wherein the lateral ramp further includes at least one outer edge and at least one guardrail disposed proximate the at least one outer edge.

17. The aircraft of claim 14, further comprising a divider rail disposed between the first inflatable structure and the second inflatable structure.

18. The aircraft of claim 17, wherein the divider rail is to separate the first inclined sliding surface from the second inclined sliding surface.

19. The evacuation slide of claim 14, wherein the first inclined sliding surface includes a first pair of longitudinal sides and the second inclined sliding surface includes a second pair of longitudinal sides, and wherein the first inflatable structure includes a guardrail disposed along at least one side of the first pair of longitudinal sides, and the second inflatable structure includes a guardrail disposed along at least one side of the second pair of longitudinal sides.

20. The aircraft of claim 14, wherein at least one of the first inflatable structure or the second inflatable structure includes a protruding underside support section that contacts at least one of the fuselage or the wing-to-body fairing to brace the inflatable structures against at least one of the fuselage or the wing-to-body fairing when the at least one evacuation slide is inflated.

* * * * *